United States Patent
O'Connor et al.

(10) Patent No.: US 7,448,561 B2
(45) Date of Patent: Nov. 11, 2008

(54) PROCESS FOR CONVERSION AND SIZE REDUCTION OF SOLID PARTICLES

(75) Inventors: Paul O'Connor, Hoevelaken (NL); Erik Jeroen Laheij, Amstelveen (NL); Dennis Stamires, Newport Beach, CA (US); Edwin Mark Berends, Almere-Stad (NL)

(73) Assignee: Albemarle Netherlands B.V., Amersfoort (NL)

( * ) Notice: Subject to any disclaimer, the term of this patent is extended or adjusted under 35 U.S.C. 154(b) by 173 days.

(21) Appl. No.: 10/536,340

(22) PCT Filed: Dec. 2, 2003

(86) PCT No.: PCT/EP03/13673

§ 371 (c)(1), (2), (4) Date: Jan. 26, 2006

(87) PCT Pub. No.: WO2004/050251

PCT Pub. Date: Jun. 17, 2004

(65) Prior Publication Data

US 2006/0124783 A1    Jun. 15, 2006

(30) Foreign Application Priority Data

Dec. 10, 2002  (EP) .................... 02027486

(51) Int. Cl.
*B02C 19/18*   (2006.01)

(52) U.S. Cl. ............................... 241/1; 241/29

(58) Field of Classification Search ............. 502/60, 502/71, 355, 414, 415, 80, 232; 422/120; 241/30, 29, 1, 301

See application file for complete search history.

(56) References Cited

U.S. PATENT DOCUMENTS

| 4,421,722 A | 12/1983 | Massey et al. |
| 5,810,267 A | 9/1998 | Karasawa |
| 5,921,478 A | 7/1999 | Kamiwano et al. |
| 6,051,694 A | 4/2000 | Castor et al. |

FOREIGN PATENT DOCUMENTS

| DE | 1 202 258 | 10/1965 |
| JP | 62-285777 | 12/1987 |

OTHER PUBLICATIONS

Jung, et al; "Particle Design Using Supercritical Fluids: Literature And Patent Survey;" Journal Of Supercritical Fluids; vol. 20; Aug. 2001; pp. 179-219.

Wei, et al; "Mixing And Characterization Of Nanosized Powders: An Assessment Of Different Techniques;" Journal Of Nanoparticle Research; vol. 4; 2002; pp. 21-41.

*Primary Examiner*—Mark Rosenbaum
(74) *Attorney, Agent, or Firm*—Jeremy J. Kliebert

(57) ABSTRACT

A combined process for the conversion of solid starting particles into solid intermediate particles and reducing the median diameter of the intermediate particles to obtain product particles. This process involves flowing a suspension of starting particles through a series of at least two conversion vessels, thereby converting at least part of the starting particles into intermediate particles, adding a supercritical fluid to one or more of the conversion vessels, thereby forming a supercritical suspension, and releasing pressure from the supercritical suspension, thereby expanding the suspension and converting the intermediate particles into product particles.

10 Claims, No Drawings

PROCESS FOR CONVERSION AND SIZE REDUCTION OF SOLID PARTICLES

The present invention relates to the conversion of solid particles with a certain median diameter into solid product particles with a smaller median diameter.

One of the most common ways of reducing a particle size is milling. However, particles with a median diameter below about 1 micron usually cannot be obtained by regular milling procedures.

Today, nanotechnology is a growing research area with high expectations. This technology requires so-called nanoparticles, which are defined in this specification as particles with a median particle size below about 1 micron. Such particles usually cannot be obtained by simple milling of larger particles.

U.S. Pat. No. 5,810,267 discloses a process for pulverising a powder by suspending the powder into a fluid in a supercritical state, pressurising the suspension, injecting the fluid through a nozzle, reducing pressure in the suspension fluid, and separating the fluid from the solid particles as a gas under supercritical or subcritical conditions. Exemplified in this document is the reduction of 10-micron SiC particles to 1-micron SiC particles.

The size of these particles is changed, but their chemical constitution and degree of order remain the same.

U.S. Pat. No. 5,921,478 discloses a method for dispersing particles by (i) feeding a mixture of a dispersoid and a solvent into a supercritical vessel, (ii) feeding a supercritical solvent into the supercritical vessel, (iii) heating and compressing the supercritical solvent to convert if from a gaseous phase state to supercritical fluid, (iv) mixing the mixture and the supercritical fluid in the supercritical vessel to obtain a supercritical mixture, and (v) introducing the supercritical mixture to an explosion-crashing tank to release the supercritical mixture to atmospheric pressure and to collide the supercritical mixture with a collision portion of the supercritical tank to effect dispersion of the dispersoid.

This method results in crashing and dispersing of the particles. The chemical constitution of the particles and their degree of order remain the same.

It would be desirable, however, to be able to combine (a) changing the particles' degree of order and (b) reducing the size of these particles to, if desired, nanometer scale in one process. The present invention provides such a process.

The process according to the invention relates to a combined process for the conversion of solid starting particles into solid intermediate particles and reducing the median diameter of the intermediate particles to obtain product particles, which process involves the following steps:

a) flowing a suspension of starting particles through a series of at least two conversion vessels, thereby converting at least part of the starting particles into intermediate particles, b) adding a supercritical fluid to one or more of the conversion vessels, thereby forming a supercritical suspension, and c) releasing pressure from the supercritical suspension, thereby expanding the suspension and converting the intermediate particles into product particles.

The solid starting particles are either amorphous or possess a degree of order. During the process they are preferably converted into intermediate particles which (i) when the starting particles are amorphous, possess a degree of order, or (ii) when the starting particles possess a degree of order, possess a different order, a different degree of order, or no order.

The term "a degree of order" is defined as the presence of a crystalline or quasi-crystalline, i.e. non-amorphous, phase detectable by X-ray diffraction (XRD), scanning electron microscopy (SEM), transmission electron microscopy (TEM), or extended X-ray adsorption fine structure (EX-AFS). Normally, a degree of order will be X-ray detectable (either as a peak or as a lump), but in the case of very small crystallites (i.e. below the XRD detection limit) more advanced techniques are required to detect a degree of order: SEM, TEM, or EXAFS. On the other hand, amorphous is defined as not having a degree of order as defined above. The degree of order can be estimated for instance from the width of the XRD-peak (or lump) if the crystallites are X-ray detectable. The narrower this peak, the higher the degree of order will be. A different order will follow from the detection of different crystal structures or morphologies by the techniques mentioned above. No order means amorphous.

The process according to the invention is particularly suitable for the production of nanoparticles. Hence this process can be favourably applied for the preparation of product particles with a median diameter of below 1 micron, more specifically 1-500 nm, even more specifically below 1-200 nm, and most preferably 1-100 nm.

The intermediate particles and, in most cases, also the starting particles have a larger median diameter than the product particles. Preferably, the median diameter of the starting particles is above 1 micron, preferably about 1-1,000 microns, more preferably 1-500 microns, and even more preferably 1-200 microns.

The diameter of the particles is determined by measuring the diameter of a representative amount of particles as viewed by electron microscopy. The median diameter is the middle of the distribution: 50% of the number of particles are above the median diameter and 50% are below the median diameter.

The starting, intermediate, and product particles are preferably made of inorganic materials.

The starting particles preferably are of low-cost material, such as aluminium oxides or hydroxides, e.g., bauxite, crystalline aluminium trihydrate (ATH), gibbsite, bauxite ore concentrate (BOC) or thermally treated forms thereof (e.g. calcined and/or flash-calcined forms); synthetic and natural clays, such as kaolin, sepiolite, hydrotalcite, smectite, or bentonite; silica ores, such as sand or diatomaceous earth; magnesium sources, such as magnesium salts, magnesium oxides or hydroxides, e.g., brucite, magnesium carbonate, magnesium hydroxy carbonate; zirconium compounds, such as zirconia, zircon or baddeleyite; titanium oxides or hydroxides; sorbents, catalysts or catalyst precursors, for instance in the form of microspheres, i.e. spray-dried particles, etc.

If desired, the starting particles may be mechanically treated (e.g. milled) before use in the process according to the invention in order to reduce their particle size.

Examples of conversions of starting particles into intermediate particles are the conversion of a precipitated mixture of aluminium sulphate and aluminium nitrate into boehmite, the conversion of bauxite ore concentrate (BOC) into boehmite, the conversion of quasi-crystalline boehmite into micro-crystalline boehmite, the conversion of an inexpensive silicate ore (such as sand) into silica or silica-based materials, the conversion of a silicon source (e.g. sand, silica sol, water glass, diatomaceous earth) and a solid magnesium source (e.g. MgO, brucite, hydromagnesite or magnesium salts) into a layered magnesium silicate, recrystallisation of zirconia ores (e.g. zircon or baddeleyite) to highly crystalline zirconia, conversion of a silicon source and a solid aluminium source (e.g. aluminium oxide or hydroxide) and optionally seeds and/or templates into molecular sieves (e.g. zeolite X, Y, or A, ZSM-type zeolite, zeolite beta, mesoporous molecular sieves), the conversion of solid trivalent and divalent metal sources (e.g. an aluminium and a magnesium source) into anionic clays (e.g. hydrotalcite), the conversion of two solid divalent metal sources into layered hydroxyl (double) salts, the conversion of a silicon source and a solid aluminium source and optionally bentonite seeds into bentonite, and the conversion of a silicon source, a solid aluminium source, and a solid magnesium source into smectites.

Furthermore, all sorts of combinations of the above conversions can be used to form various composites, for instance anionic clay and boehmite-containing composites, or composites comprising anionic clay, boehmite, and zeolite.

The product particles will generally consist of the same material as the intermediate particles, except for their smaller particle size. However, if the intermediate particles are layered materials, such as anionic clays (e.g. hydrotalcite), cationic clays (e.g. smectites, kaolin, bentonite, sepiolite, etc.), or layered hydroxy (double) salts, pressure release may result in delamination and/or exfoliation of the layered structure.

The process according to the invention involves as a first step flowing of a suspension of starting particles through a series of at least two conversion vessels and as a last step releasing the pressure of the suspension. The timing of the introduction of the supercritical fluid can be varied according to the following three embodiments.

In a first embodiment, the starting particles are converted into intermediate particles in a non-supercritical liquid under atmospheric or super-atmospheric pressure using, e.g., the first one, two, or three conversion vessels. Suitable non-supercritical liquids to be used in this process include water, alcohols such as methanol, ethanol, n-propanol, isopropanol, etc., and hydrocarbon liquids such as toluene, hexane, white spirits, gasoline, etc.

In the subsequent conversion vessel, the suspension containing the intermediate particles—optionally after its liquid content has been reduced and/or after being mechanically treated—is combined with a supercritical fluid to obtain a supercritical suspension. Next, the supercritical suspension is pumped via a nozzle or orifice into a subsequent vessel, thereby expanding the supercritical suspension and forming the product particles.

In a second embodiment, supercritical fluid is added during the conversion of the starting particles into intermediate particles. Hence part of the conversion into intermediate particles takes place under supercritical conditions. Again, before combining the suspension and the supercritical fluid, the liquid content of the suspension may be reduced, e.g., by drying or dewatering, and the suspension may be subjected to a mechanical treatment (e.g. milling).

After the desired degree of conversion, the supercritical suspension is pumped via a nozzle or orifice into a subsequent vessel, thereby expanding the supercritical suspension and forming the product particles.

In these first two embodiments, the conversion vessel(s) that does/do not contain supercritical fluid is/are generally kept at lower pressure than the vessel(s) charged with supercritical fluid. In order to enable large pressure differences between individual vessels, the apparatus can be equipped with a high-pressure slurry pump. This allows continuous processing. Alternatively, the process can be conducted semi-continuously by interrupting the preparation of the intermediate particles during the sequence of (a) charging one of the vessels with supercritical fluid and (b) expanding the supercritical suspension. During this interruption period, the conversion vessel(s) under supercritical conditions is/are disconnected from the conversion vessel(s) under non-supercritical conditions.

In a third embodiment, the entire process of converting the starting particles into intermediate particles is conducted under supercritical conditions. Hence the supercritical fluid is added to the first of the series of at least two conversion vessels. Finally, after the intermediate particles have been formed, the supercritical suspension is pumped via a nozzle or orifice into a subsequent vessel, thereby expanding the supercritical suspension and forming the product particles.

Examples of supercritical fluids include supercritical $CO_2$, supercritical nitrogen, supercritical ethylene, supercritical xenon, supercritical ethane, supercritical nitrous oxide, supercritical propane, supercritical ammonia, supercritical pentane, supercritical isopropanol, supercritical methanol, supercritical toluene, and supercritical water.

Supercritical $CO_2$ is the preferred supercritical fluid to be used in the process according to the invention. $CO_2$ has a mild critical temperature (31° C.), it is inflammable, and non-toxic. Furthermore, it can be obtained from existing industrial processes without further contribution to the greenhouse effect. Supercritical carbon dioxide has a high diffusivity, a low viscosity, and a low surface tension. An additional advantage of using supercritical $CO_2$ is that gaseous $CO_2$ will evaporate and the dry solid product particles can be easily collected.

An example of an apparatus comprising at least two conversion vessels, which apparatus can thus be suitably used in the process of the invention, is the apparatus according to US 2003-0003035 and WO 03/078055. This apparatus may comprise a feed preparation vessel, to which the initial solid particles and optionally seeds, caustic and/or acid can be added and mixed with liquid. Forced by way of a feed pump, the resulting suspension can be led to the first of a series of at least two, but preferably three to five, conversion vessels. Each of the conversion vessels may contain injectors—via which additional liquid, acids, bases, seeds, and other ingredients can be introduced—and a mixer, preferably an axial or co-axial mixer, for instance a double-helix impeller or an anchor stirrer combined with an EKATO-INTERMIG® (an impeller suitable for mixing slurries with low viscosity, of which the outer blades pump downward while the inner blades pump upward).

As supercritical fluids require super-atmospheric pressure (in the case of $CO_2$ above about 73 bar), the conversion vessels working under supercritical conditions must be autoclaves. A typical pressure range for supercritical conditions is about 200-300 bar. A typical example of an autoclave that can be used for this purpose is an AHPT autoclave supplied by AHPT Ltd., P.O. Box 11807, Tel Aviv 61116, Israel.

The pressure is preferably released by spraying the supercritical suspension through a nozzle or orifice—which may be heated to prevent freezing owing to Joule-Thompson cooling—into a subsequent vessel. This method is also called Rapid Expansion of Supercritical Suspension (RESS).

The subsequent vessel can be kept under close to atmospheric conditions or under somewhat higher pressure, e.g. 40-50 bar. The latter enables a more energy-efficient and economical recycling of the supercritical fluid.

In order to enable the conversion of the starting particles into intermediate particles, additional compounds (seeds, templates, additives, additional starting particles) may be added to one or more of the conversion vessels during processing of the suspension. Furthermore, the temperature in each of the conversion vessels may be different.

In addition, surfactants, e.g. acetates or gluconates, can be added to the suspension in order to reduce the interaction between the non-supercritical liquid and the solid particles and to enhance the interaction of the solid particles and the supercritical fluid. This is especially desired if polar liquids such as water are present in the suspension.

Further, metal additives can be added to the suspension, in order to obtain metal-doped intermediate particles and/or starting particles. Examples of such metal additives are compounds comprising an element selected from the group of alkaline earth metals (for instance Mg, Ca, and Ba), transition metals (for example Mn, Fe, Co, Ti, Zr, Cu, Ni, Zn, Mo, W, V, Sn, Nb), actinides, rare earth metals such as La and Ce, noble metals such as Pt and Pd, silicon, gallium, boron, titanium, phosphorus, and mixtures thereof. The metal additive can be added to the suspension together with the starting particles or separately, e.g., by adding the metal additive to one of the subsequent vessels.

If a layered material is formed as intermediate particle, it may be desirable to have an intercalating agent present in the suspension to enable the formation of an intercalated layered material. The term "intercalating agent" is defined as a compound that can be hosted between the layers of the layered material, thereby increasing the spacing between the layers. Examples of intercalating agents are organic compounds, such as organic compounds comprising an aromatic ring and/ or a functionality selected from the group consisting of carbonyl, carboxyl, hydroxyl, amide, ether, ammonium, and ester. Examples of such compounds are amino acids (e.g. glycine serine, L-aspartic acid), oleates, gluconates, carboxymethylated carbohydrates (e.g. carboxymethyl cellulose), organic solvents (e.g. dimethyl sulphoxide, isophorone, gamma-butyrolactone, n-methylpyrrolidone, 2-pyrrolidone, diglyme, carprolactam, furfuryl alcohol, tetrahydrofuran), quaternary ammonium cations, alkyl sulphates (e.g. sodium dodecyl sulphate, alkyl sulphonates (e.g. styrene sulphonate, polystyrene sulphonate), and other ionic alkyl chains or surfactants. Examples of anionic inorganic compounds that can be used as intercalating agent are pillaring anions such as $Fe(CN)_6^{3-}$, $HVO_4^-$, $V_2O_7^{4-}$, $HV_2O_{12}^{4-}$, $V_3O_9^{3-}$, $V_{10}O_{28}^{6-}$, $Mo_7O_{24}^{6-}$, $PW_{12}O_{40}^{3-}$, $B(OH)_4^-$, $[B_3O_3(OH)_4]^-$, $[B_3O_3(OH)_5]^{2-}$, $B_4O_5(OH)_4^{2-}$, $HBO_4^{2-}$, $HGaO_3^{2-}$, $CrO_4^{2-}$, $Cr_2O_7^{2-}$, or Keggin-ions.

The non-supercritical suspension flowing through the conversion vessels may have a high Solids to Liquid Ratio (SLR). The SLR of the suspension is defined as the weight ratio of solids, including crystal water, to liquid in the suspension. The optimal SLR depends on the rheological behaviour of the suspension, e.g. the tendency to form a gel, and may be in the range 0.1-1.33, more preferably 0.3-1.33, even more preferably 0.5-1.33, and most preferably 0.65-1.00. The viscosity of the non-supercritical suspension preferably is between 1 and 500 Pa·s at a shear rate of $0.1 \, s^{-1}$.

With the process according to the invention, product particles for various applications can be prepared. Their application depends on the type of material and the size of the particles. Nanoparticles, for instance, can find their use in, e.g., molecular electronic devices (e.g. molecular wires, diodes, transistors, memories), sensors, nanopumps, catalysis (as catalyst, catalyst additive, catalyst support, etc), adsorbents, coating compositions (e.g. primer, base coat and/or clear coat for metallic and/or plastic substrates), paper making, paper conserving (e.g. conserving historical documents), polymers (as fillers), etc.

EXAMPLES

Example 1

This Example illustrates the process according to the invention for the conversion of aluminium trihydrate and magnesium oxide starting particles into anionic clay intermediate particles and the conversion of these anionic clay intermediate particles into anionic clay product nanoparticles.

24.2 kg aluminium trihydrate (ATH M6® from Alcoa), 25 kg MgO (Zolitho 40® from Martin Marietta), and 150.8 kg water were mixed in a feed preparation vessel of 250 l. The solids to liquid ratio was 0.33. The molar ratio $MgO/Al_2O_3$ was 4.

The suspension was pumped to the first conversion vessel. By way of steam injection the suspension was heated up to 170° C., thereby decreasing the solids to liquid ratio to 0.25. The suspension was led through the subsequent two conversion vessels with such a flow that the average residence time was about 45 minutes.

The suspension in all conversion vessels was agitated using a double-helix impeller at 76-83 rpm. Because of a slightly exothermic reaction the temperature increased from 170° C. in the first conversion vessel to 180° C. in the second one. The pressure of the whole system was controlled by a pressure valve positioned immediately beyond the third conversion vessel. The system pressure in this experiment was maintained at 12 bar.

X-ray diffraction (XRD) measurements showed that a Mg—Al anionic clay was formed. The anionic clay intermediate particles had a median particle diameter of about 4 microns.

After the third conversion vessel, the suspension was charged into a fourth conversion vessel, which was pressurised with $CO_2$ to the desired conditions in the supercritical regime (T>304.2 K, p>73 atm), using a supercritical $CO_2$ pump. Before being charged with the supercritical fluid, the fourth conversion vessel was disconnected from the third conversion vessel and the preparation of the anionic clay starting particles was interrupted. The resulting supercritical suspension was agitated at high speed (1,000-2,000 rpm) for 10 minutes. The weight ratio $CO_2$ to $H_2O$ in the suspension was higher than 5, thereby reducing the solids to liquid ratio to less than 0.054.

Next, the suspension was released through a nozzle into a subsequent vessel, which was kept under close to atmospheric conditions, thereby venting the wet $CO_2$ gas to a $CO_2$ gas recovery and drying system. The dried $CO_2$ gas was recycled using a supercritical $CO_2$ compressor/pump. According to the semi-continuous mode of this process, the third and fourth conversion vessels were re-connected, the production of the product particles was resumed, and the fourth conversion vessel was again charged with starting particles.

The product particles collected from the last vessel were analysed to be Mg—Al anionic clay particles with a median particle size of less than 500 nm.

Example 2

Example 1 was repeated, except that instead of supercritical $CO_2$, supercritical nitrogen (126 K, 33.5 atm) was used. Again, the product particles comprised Mg—Al anionic clay and had a median particle size of less than 500 nm.

Example 3

This Example illustrates the conversion of sodium silicate and flash-calcined alumina starting particles into zeolite intermediate particles and the conversion of these intermediate particles into zeolite product particles.

3.73 kg aqueous sodium silicate containing 28 wt % solids (as sol particles) were mixed with 40 g aluminium CP-3 (flash-calcined aluminium trihydrate) and 2.80 kg water under atmospheric conditions to form a suspension. The solids to liquid ratio (SLR) of this suspension was 0.20. In calculating the SLR, 28 wt % of the sodium silicate mass was counted as solid, the other 72 wt % was counted as liquid. ZSM-5 seeds (10 wt %) were added. The suspension was heated to 170° C. and kept at this temperature for 300 minutes. The suspension was agitated using a double-helix impeller at 76-83 rpm.

The so-formed zeolite intermediate particles had a median diameter of about 7 microns.

The suspension was charged into a second vessel, which was pressurised with $CO_2$ to the desired conditions in the supercritical regime (T>304.2 K, p>73 atm), using a supercritical $CO_2$ pump. The resulting supercritical suspension was agitated at high speed (1,000-2,000 rpm) for 10 minutes. The weight ratio $CO_2$ to $H_2O$ in the suspension was higher than 5, thereby reducing the solids to liquid ratio to less than 0.033.

Next, the suspension was released through a nozzle into a third vessel, which was kept under close to atmospheric conditions, thereby venting the wet $CO_2$ gas to a $CO_2$ gas recovery and drying system. The dried $CO_2$ gas was recycled using a supercritical $CO_2$ compressor/pump.

The product particles collected from the third vessel were analysed to be ZSM-5 with a Silica to Alumina Ratio (SAR) of 55. 90% of these product particles had a particle size of below 1 micron.

Example 4

Examples 1 and 2 were repeated, except that before being charged to the fourth conversion vessel, the suspension was dewatered using a high-pressure filtration step, thereby reducing the water content (LOI) of the suspension to less than 10 wt %. This increased the supercritical fluid-to-water ratio in the fourth conversion vessel.

Example 5

Example 3 was repeated, except that before being charged to the second vessel, the suspension was dewatered using a high-pressure filtration step, thereby reducing the water content (LOI) of the suspension to less than 10 wt %. This increased the supercritical fluid-to-water ratio in the second vessel.

Example 6

Examples 1-5 were repeated, with sodium gluconate being added to the suspension.

Example 7

Examples 1-6 were repeated, except that before being released into the vessel under close to atmospheric conditions, the supercritical suspension was first released into a vessel under somewhat higher pressure (in the case of supercritical $CO_2$: 40-50 bar), thereby enabling more energy-efficient and economical recycling of the supercritical fluid.

The invention claimed is:

1. A process for the conversion of solid starting particles into solid intermediate particles and the reduction of the median diameter of the intermediate particles to obtain product particles, which process involves the following steps:
   a) flowing a suspension of starting particles through a series of at least two conversion vessels, thereby converting at least part of the starting particles into intermediate particles, which
      i) when the starting particles are amorphous, possess a degree of order, or
      (ii) when the starting particles possess a degree of order, possess a different order, a different degree of order, or no order,
   b) adding a supercritical fluid to one or more of the conversion vessels, thereby forming a supercritical suspension, and
   c) releasing pressure from the supercritical suspension, thereby expanding the suspension and converting the intermediate particles into product particles.

2. The process of claim 1 wherein the solid product particles have a median diameter of below 1 micron.

3. The process of claim 2 wherein the solid product particles have a median diameter of 1-500 nm.

4. The process of claim 3 wherein the solid product particles have a median diameter of 1-200 nm.

5. The process of claim 1 of wherein the solid starting particles are inorganic solid particles.

6. The process of claim 1 of wherein the intermediate particles comprise a material selected from the group consisting of anionic clay, smectite, zeolite, boehmite, silica, cationic clays, layered hydroxy salts, and combinations thereof.

7. The process of claim 1 of wherein the supercritical fluid is supercritical carbon dioxide.

8. The process of claim 1 of wherein at least part of the conversion of the starting particles into the intermediate particles takes place under supercritical conditions.

9. The process of claim 1 of wherein the supercritical suspension is added to the first of the series of conversion vessels.

10. The process of claim 1 wherein the supercritical fluid is added to the suspension of starting particles after conversion of the starting particles into the intermediate particles.

* * * * *